United States Patent Office 3,262,515
Patented July 26, 1966

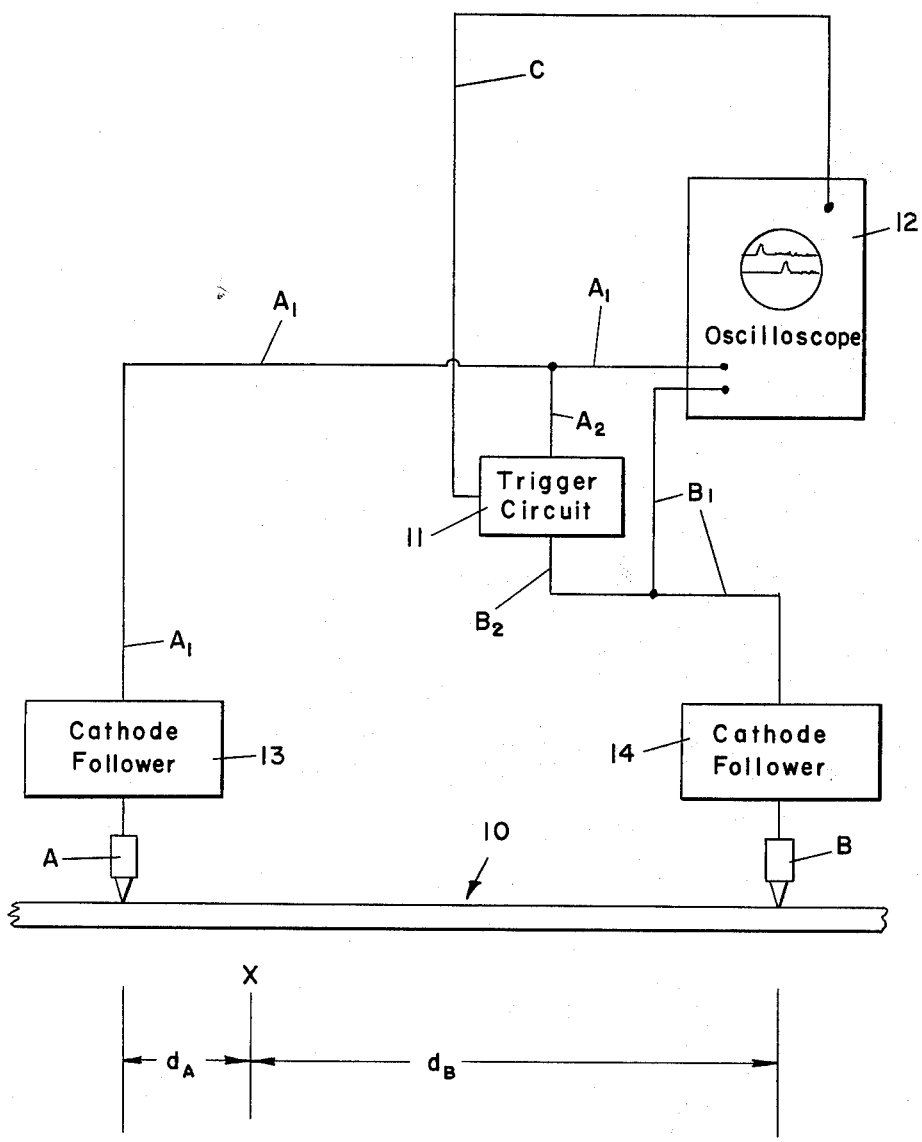

3,262,515
APPARATUS FOR LOCATING ARCS IN WAVEGUIDES
John J. Drum, Sudbury, Mass., assignor, by mesne assignments, to the United States of America as represented by the Secretary of the Navy
Filed July 12, 1963, Ser. No. 294,778
3 Claims. (Cl. 181—.5)

This invention broadly concerns apparatus for locating a source of sound which is transmitted through a sound conducting element. The invention is especially useful with waveguide structures and will be described and explained with particular reference to a waveguide conduit structure, but it will be appreciated that the invention has broad application.

When signal energy is transmitted during peak operation of radar systems at powers which compare with or approximate the breakdown levels in the waveguides, it is not uncommon for arcs to occur in the waveguides. This arc occurrence has an adverse effect on the operation of a radar system and also makes it difficult to properly conduct or evaluate development engineering in connection with the radar system. It is very difficult for an observer to determine with any reasonable degree of accuracy the location of the arcs by the visible or audible characteristics of an arc, since an arc is not readily observable in a waveguide and the speed of sound through the waveguide structure is too great.

It has been found by locating audio detectors at spaced intervals along a waveguide run and visually displaying the detector responses, that an observer can determine the general arc location from the sequence of the displays of the detector responses. The determination can be made in accordance with the time delay between the display of the first response and that of a second or later response and the visual display may conveniently be made on an oscilloscope or by other means such as electronic counters.

The distance between adjacent detectors on the waveguide will determine a zone which is to be monitored and this distance may be as small as several feet, or it may be as great as a hundred feet. When the information is displayed, the observer can, within the limits of his visual acuity, determine rather accurately the location of the arc when it has occurred within the monitoring zone or he can determine the direction from which the arc sound came, if the arc has occurred outside the monitoring zone.

The broad object of the invention is to detect at different points sound which is produced in a sound-conducting element and to visually display the audio signals from each point separately.

Another object of the invention is to detect at spaced points sound produced by arcs occurring in a waveguide conduit and to visually display the audio signals separately on a multiple trace oscilloscope.

Another object of the invention is to apply a pair of audio detectors at spaced points on a waveguide to define a monitoring zone therebetween and to transmit the audio signals in sequence through a triggering circuit for operating a dual trace oscilloscope.

Other objects, advantages and novel features of the invention will become apparent from the following detailed description of the invention when considered in conjunction with the accompanying single figure of the drawing, wherein:

At 10 is represented a waveguide which has two audio detectors, identified as A and B, located thereon. The detectors, as shown, are preferably of the crystal phonograph pick-up type and the monitoring zone will be that length of the waveguide located between the detectors A and B. Each detector is connected through a trigger circuit 11 to a dual trace oscilloscope 12 and each detector is also directly connected with the oscilloscope to display the signals. Tracing the circuitry shown in the figure, the detector A is connected directly to the oscilloscope 12 by line $A_1$ while the detector B is connected directly by the line $B_1$. The line $A_1$ branches at $A_2$ to connect with the trigger circuit 11 while the line $B_1$ branches at $B_2$ to also connect with the trigger circuit 11. A line C then connects the trigger circuit 11 with the oscilloscope 12 for setting it in operation. The lines $A_1$ and $B_1$ will be connected with the internal circuitry (not shown) of the oscilloscope for the purpose of displaying the signals from the detectors A and B on the upper and lower traces, respectively, of the oscilloscope. The details of the trigger circuit 11 are not shown since this is considered unnecessary for the purpose of this invention, but the trigger circuit will be located externally of the oscilloscope and will be designed in accordance with particular oscilloscope detectors, etc., which are used. Since the detectors A and B are high impedance elements, it is desirable or necessary to provide cathode followers 13 and 14 in the respective lines $A_1$ and $B_1$ which will have low impedance in order to prevent signal loss to the trigger circuit and to the oscilloscope trace circuits.

In operation, assume that an arc occurs at point X within the waveguide 10 and that the arc generates an audible sound or sound above the ambient noise level. The sound will travel along the waveguide wall about 10 to 15 times as rapidly as it does in air, depending on the material of which the waveguide is constructed. Since detector A is the nearer to point X, it responds first and the signal in line $A_1$ and branch $A_2$ will operate the trigger circuit 11. The trigger circuit will initiate the travel of both the upper and lower traces across the oscilloscope face and the upper trace will show a "pip," as indicated on the upper trace, as a signal from A and the "pip" will also indicate to an observer that detector A operated the trigger circuit. Sometime later, the "pip" on the lower trace will appear as a signal from detector B. The signal on the upper trace will be displayed from time $t=t_1$ while the signal on the lower trace will be displayed at some later time $t=t_1+\Delta t$, where $$\Delta t = \frac{d_B - d_A}{V}$$

and V represents the mean velocity of sound travel in the waveguide walls. Consequently, an observer, by noting which signal is delayed, and the length of time it is delayed, can locate the source of arc sound between the detectors with considerable accuracy. Additionally, an observer can determine whether or not the arc occurred outside the monitoring zone and the direction of the arc occurrence from the detector which cause the first "pip" to be displayed.

The oscilloscope may conveniently be monitored visually and a hood may be utilized in cases where the arcs in the waveguide 10 occur frequently or in cases where the arc frequency is low, an oscilloscope camera can be used advantageously.

In monitoring the oscilloscope it will be necessary to consider ambient noise which may cause mechanical vibrations in the waveguide but in most uses of the device, the arc signals will be high enough above the noise level to permit proper trigger operation by pulses from the detectors since experience has shown that ambient noise is considerably lower in frequency than the arc signals, and can be differentiated.

Intense R. F. fields which are found near radar antennas may couple strongly enough into the audio circuits to cause false triggering and when the device is to be used in such a strong field location, it should be thoroughly shielded to minimize this form of interference.

The principal limitation on the accuracy in using the device is the visual acuity in monitoring the oscilloscope display. This limitation has been determined to be of the order of 2%, indicating that an arc can be located within a distance of one foot, for a 50-foot monitoring zone.

Obviously, many modifications and variations of the present invention are possible in the light of the above teachings. It is therefore to be understood that, within the scope of the appended claims, the invention may be practiced otherwise than as specifically described.

I claim:

1. Apparatus for locating an arc occurring in a waveguide conduit comprising
    (a) a plurality of sound detectors spaced along said conduit providing a monitoring zone between adjacent detectors,
    (b) said detectors being operative to pick up sound vibrations caused by the arc and form electrical signal pulses,
    (c) a plurality of display devices arranged in a bank and providing a display device for each detector,
    (d) a plurality of pulse transmitting lines providing a separate line between a display device and a cooperating detector, and
    (e) each display device being operative to indicate sound vibrations picked up by its cooperating detector whereby an operator can determine the location of the arc by observing the sequence of operation of adjacent display devices.

2. Apparatus for locating an arc occurring in a waveguide conduit comprising
    (a) a plurality of sound detectors spaced along said conduit providing a monitoring zone between adjacent detectors,
    (b) said detectors being operative to pick up sound vibrations caused by the arc and form electrical signal pulses,
    (c) a plural trace oscilloscope providing a trace for each detector,
    (d) a plurality of pulse transmitting lines providing a separate line between each trace and its cooperating detector, and
    (e) each trace being operative to indicate sound vibrations picked up by its cooperating detector whereby an operator can determine the location of the arc by observing the sequence of operation of the traces on the oscilloscope.

3. Apparatus for locating an arc occurring in a waveguide conduit comprising
    (a) a pair of phonograph pick-up sound detectors spaced along said conduit providing a monitoring zone therebetween,
    (b) a dual trace oscilloscope providing a trace for each detector,
    (c) a trigger circuit connected to said oscilloscope,
    (d) a first pulse transmitting line between one detector and said trigger circuit,
    (e) a second pulse transmitting line between the other detector and said trigger circuit, and
    (f) said pulse transmitting lines supplying pulses to the oscilloscope traces whereby location of the arc may be determined by observing the sequence of operation of the oscilloscope traces.

References Cited by the Examiner

UNITED STATES PATENTS

| | | | |
|---|---|---|---|
| 2,191,120 | 2/1940 | Slichter | 181—0.5 |
| 2,620,890 | 12/1952 | Lee et al. | 340—18 X |
| 3,149,304 | 9/1964 | Summers | 181—0.5 X |

BENJAMIN A. BORCHELT, *Primary Examiner.*

M. F. HUBLER, *Assistant Examiner.*